United States Patent [19]

Adams et al.

[11] Patent Number: 4,952,016
[45] Date of Patent: Aug. 28, 1990

[54] OPTICAL POWER LIMITER

[75] Inventors: Michael J. Adams, Woodbridge; David A. H. Mace, Ipswich, both of England

[73] Assignee: British Telecommunications public limited company, Great Britain

[21] Appl. No.: 382,682
[22] PCT Filed: Jan. 3, 1989
[86] PCT No.: PCT/GB89/00012
§ 371 Date: Aug. 11, 1989
§ 102(e) Date: Aug. 11, 1989
[87] PCT Pub. No.: WO89/06372
PCT Pub. Date: Jul. 13, 1989

[30] Foreign Application Priority Data

Jan. 5, 1988 [GB] United Kingdom ............... 8800121
Jan. 6, 1988 [GB] United Kingdom ............... 8800221

[51] Int. Cl.$^5$ ............................................ G02B 6/10
[52] U.S. Cl. ........................... 350/96.12; 350/96.10; 350/356; 250/205
[58] Field of Search ............... 350/96.11, 96.12, 96.13, 350/96.14, 313, 354, 356; 250/205, 213 A; 372/8, 25, 41

[56] References Cited

U.S. PATENT DOCUMENTS

| 4,093,353 | 6/1978 | Lang | 350/313 |
| 4,483,004 | 11/1984 | Inaba et al. | 372/8 |
| 4,515,429 | 5/1985 | Smith et al. | 350/96.13 |
| 4,521,681 | 6/1985 | Inaba et al. | 250/205 |
| 4,723,248 | 2/1988 | Harter et al. | 372/25 |
| 4,765,719 | 8/1988 | Fergason | 350/350 S |
| 4,775,215 | 10/1988 | Teng et al. | 350/96.34 |
| 4,776,677 | 10/1988 | Park et al. | 350/354 |

OTHER PUBLICATIONS

Stryland et al., *Two Photon Absorption, Nonlinear Refraction, and Optical Limiting in Semiconductors*, pp. 613-623, Optical Engineering, vol. 24, No. 4, Jul./Aug. 1985.

Bogatov et al., *Nonlinear Refraction in Semiconductor Lasers (Review)*, pp. 308-325, Sov. J. Quantum Electron., vol. 15, No. 3, 3/85.

Abashkin et al., *Nonlinear Absoption of Light in Glassy Arsenic Sulfide Fibers in the Energy Range $Hv<E_g$*, pp. 1343-1345, Sov. J. Quantum Electron., vol. 12, No. 10, 10/82.

Cada et al, *Nonlinear Guided Waves Coupled Nonlinearly in a Planar GaAs/GaAiAs Multiple Quantum Well Structure*, pp. 755-757, Appl. Phys. Lett., vol. 49, No. 13, 9/29/86.

Stegeman et al., *Nonlinear Integrated Optics*, pp. R57-R78, J. Appl. Phys., vol. 58, No. 12, 12/85.

Ogusu, *TE Waves in a Symmetric Dielectric Slab Waveguide with a Kerr-Like Nonlinear Permittivity*, pp. 65-72, vol. 19, No. 1, Jan. 1987.

Primary Examiner—William L. Sikes
Assistant Examiner—Akm E. Ullah
Attorney, Agent, or Firm—Nixon & Vanderhye

[57] ABSTRACT

An optical power limiter structure comprises an asymmetric waveguide showing a defocussing nonlinearity of the core region material. The structure comprises a cladding region layer (2) and a core region layer (3) grown on a substrate (1). The core region layer (3) upper surface is exposed to air. By using an optical signal of wavelength λ slightly greater than the bandgap equivalent wavelength of the core region material, the structure exploits a defocussing nonlinearity of semiconductor materials in a manner enhanced by the asymmetry of the waveguide.

12 Claims, 6 Drawing Sheets

Fig. 3
PROPOSED RIB WAVEGUIDE STRUCTURE

Fig. 7
THE NONLINEAR RIB WAVEGUIDE

Fig. 8
MULTILAYER DIVISION OF RIB WAVEGUIDE

Fig. 11

CORE : BAND EDGE 1530 nm
       INDEX 3·43

CLADDING 1 : BAND EDGE 1500 nm
             INDEX 3·38

CLADDING 2 : BAND EDGE 1650 nm
             INDEX 3·38

InP SUBSTRATE

MQW WAVEGUIDE POWER LIMITER STRUCTURE

CLADDING 1 IS NON-ABSORBING AT 1550 nm
CLADDING 2 IS ABSORBING AT 1550 nm

NUMBERS QUOTED ARE ARBITRARY BUT TYPICAL FOR
AN OPERATING WAVELENGTH OF ~1550 nm

OPTICAL POWER LIMITER

The present invention relates to optical power limiters. It finds particular application in optical communications.

A device which has considerable potential for use in optical communications systems is an optical limiter. Placed prior to the photodetector in an optical receiver, it could alleviate problems encountered with dynamic range limitations in conventional receivers.

Different forms of optical limiter have been proposed and demonstrated, a number of which make use of nonlinear optics. If the limiter is formed in an optical waveguide then there are several additional advantages, foremost amongst these being the ability to confine the radiation to small dimensions, ie high power densities, and thus achieve limiting action at relatively modest powers by comparison with bulk (non-waveguide) limiters. Furthermore, if the waveguide is made of a semiconductor material then there exists the potential for integration of the limiter with the photodetector and with other optical components also fabricated as semiconductors.

(An optical waveguide comprises a core region of a first material, and an outer, cladding region of a second material. The refractive index of the core material is higher than that of the cladding material, having the effect of guiding optical radiation transmitted by the waveguide to propagate at least substantially along the core region. Neither the core nor the cladding region necessarily exhibits only one uniform refractive index. In epitaxially grown semiconductor waveguides the core generally has a rectangular cross section, the cladding being provided by characteristics of the layers of the semiconductor structure concerned).

Waveguide optical limiters are known which rely on nonlinear optical behaviour resulting in changes in refractive index with input signal intensity. They rely on the characteristic of certain materials that refractive index increases with optical intensity. Hence they can be designed so that the difference in refractive index of core and cladding materials reduces as input signal intensity increases. As the diffference decreases, the waveguiding properties of the structure decrease until when the refractive index difference disappears altogether, optical radiation is no longer confined even substantially to the core region. If the output of the structure is taken from the core region, this shows a power limited characteristic.

Waveguide optical limiters have been reviewed by Seaton et al (Optical Engineering, Volume 24, No. 4, pp 593–599, 1985). However, because to date most of these have relied on nonlinear optical behaviour wherein refractive index increases with optical intensity, they have relied on nonlinearity of the cladding material of the waveguide, rather than of the core material. That is, as the optical intensity increases, the refractive index of the cladding material ($n_s$) increases, so reducing the refractive index difference between core and cladding ($n_c - n_s$) and consequently reducing the strength of the waveguiding characteristic.

Although such a device can act as an optical limiter, its response occurs at relatively high values of input signal intensity for the field of optical communications. This is because the major part of the optical radiation is carried by the core material, not the cladding material, but it is the response of the cladding material which must produce the limiting effect.

Some analyses have been published pertaining to waveguide structures where the nonlinear behaviour occurs in the core (eg Boardman and Egan, IEEE Journal of Quantum Electronics, Vol. QE-22, No. 2, pp 319–324 1986), but because again they rely on materials whose refractive index increase with intensity, the situation considered is that of a self-focussing nonlinearity, ie one where the refractive index of the core material increases with increasing optical intensity, rather than the opposite case of a defocussing nonlinearity. There is therefore no obvious way to make an optical limiter with such a structure.

There is a publication by Ogusu (Optical and Quantum Electronics, Volume 19, No. 2, pp 65–72 1987) which considers a waveguide with a defocussing nonlinear characteristic. Ogusu also states that the waveguide can be used as an optical power limiter. However, the optical intensities at which Ogusu's structure would limit the power are likely to be far higher than those of interest in optical communications systems. If the waveguide structure disclosed were designed to limit at lower intensities, then the tolerances placed on refractive index differences between core and cladding materials would be so fine as to preclude the device ever being realised in a practical embodiment. Further, the waveguide does not comprise semiconductor materials, and relies on optical characteristics not available in practical semiconductor structures. It cannot therefore even potentially be integrated with a photodetector or other optical component.

It has been realised, in making the present invention, that it is possible to exploit characteristics of semiconductor materials so as to produce a practical device with an optical power limiting action, suitable for use at the powers relevant to optical communications systems.

According to the present invention, there is provided an optical power limiter structure for use in limiting the power of an optical signal having a wavelength $\lambda$, comprising a direct-gap semiconductor material waveguide, having a core region of material of refractive index $n_c$ bounded on a first side by a cladding region of refractive index $n_s$ and bounded on a second, opposing side by a cladding region of material of refractive index $n_a$, wherein $\lambda$ is slightly greater than the band-gap equivalent wavelength of the core region material, $\lambda_c$, but substantially greater than the band gap equivalent wavelength of the cladding region bounding the second side, $\lambda_s$, and wherein $n_c$ varies inversely with the intensity of the optical signal at the wavelength $\lambda$, but $n_s$ and $n_a$ remain at least substantially constant, such that at a preselected threshold intensity of the optical signal, $n_c$ becomes at least substantially equal to $n_s$.

By selecting $\lambda$ to lie slightly above $\lambda_c$, it is possible to exploit the largest optical nonlinearity occurring in semiconductor materials; that associated with resonant absorption and refraction near the band edge. For input signal photon energies just below the band edge of the core material it is possible to access a fairly strong nonlinearity in the refractive index, whilst the material in the cladding layers can be selected to behave linearly (as long as the photon energy is too far below the corresponding band edge). Hence $n_s$ and $n_a$ remain constant.

Semiconductor materials generally used in optical communications, for instance those based on the elements Ga, In, As, Al and P show the required defocussing non-linearity just below the band edge. A general formula which can be used to predict the extent to which the refractive index of a semiconductor material will change with optical intensity is given in the publication Physical Review Letters, Volume 47, Number 3, pp 197-200, 10 Jul. 1981, by D. A. B. Miller et al.

Taking the band edge as the energy level at which absorption becomes significant, that is at which absorption reaches $10^4 \text{ cm}^{-1}$, then $\lambda$ should be greater than $\lambda_c$ by an amount such that the absorption is great enough to change carrier concentration but not great enough to decrease the amount of light transmitted by a limiter structure too significantly. In general, $\lambda$ should be greater than $\lambda_c$ by a value in the range from 10 to 40 nm inclusive. This effectively selects the most significant range of the optical nonlinearity.

However $\lambda$ should be greater than $\lambda_s$ by an amount great enough to avoid significant changes in carrier concentration, and hence in refractive index $n_s$, of the cladding material bounding the first side of the core region. Again the publication of D. A. B. Miller et al referenced above will enable the extent to which refractive index changes occur for particular materials and input signals to be calculated. However in general, $\lambda$ should clearly be greater than $\lambda_s$ by at least 40 nm. Preferably it should be greater than $\lambda_s$ by at least 60 nm and more preferably by at least 80 nm.

By selecting an asymmetric arrangement, $n_s$ being greater than $n_a$, the optical limiting effect is enhanced because "trail-off" of the optical signal into the cladding material is more exaggerated the greater the degree of asymmetry. Hence the optical limiting effect can be obtained at lower input signal intensities.

Preferably $n_s$ is greater than $n_a$ by an amount of the order of 1 or more. More preferably, the cladding material bounding the second side of the core region is air since this gives a semiconductor structure which is relatively easy to fabricate by epitaxial growth techniques such as metal organic vapour phase epitaxy (MOVPE).

The design of the waveguide is preferably such as to produce single transverse mode operation at the operating wavelength since this is convenient for coupling light into and out of the waveguide. Hence, if the waveguide comprises a substrate with a cladding region layer and a core region layer on the substrate, the opposing face of the core region layer being exposed to air, as a rough guide the thickness "d" of the core region layer will be selected to be of the order given by the relationship $$2d(n_o^2 - n_s^2)^{\frac{1}{2}} \leq \lambda \qquad (E1)$$

where $n_o$ = the refractive index of the core material in the adsence of an input signal.

More accurately, in an asymmetric waveguide the thickness "d" will be selected according to the relationship $$\tfrac{1}{2} \tan^{-1}\left(\frac{n_s^2 - n_a^2}{n_o^2 - n_s^2}\right)^{\frac{1}{2}} + \frac{\pi}{2} \geq d \cdot \frac{\pi}{\lambda} (n_o^2 - n_s^2)^{\frac{1}{2}} \qquad (E2)$$

Another constraint on the refractive indexes $n_o$ and $n_s$ is that they are sufficiently close for $n_c$ to approach $n_s$ at an input signal intensity which is reasonable in the circumstances in which the optical power limiter structure will be applied.

To make an optical power limiter from an optical power limiter structure according to an embodiment of the invention, it will generally be necessary to apply means for selecting an output signal. For instance this might comprise a combination of means for picking up the signal emitted from the core region of the waveguide and means for effectively discarding radiation which has "spread" into the cladding region.

Specific embodiments of the present invention will now be described, by way of example only, with reference to the accompanying drawings in which:

FIG. 5 shows an arrangement for effectively discarding radiation which has "spread" into the cladding region of an optical power limiter structure as shown in FIG. 1.

Figure 1:
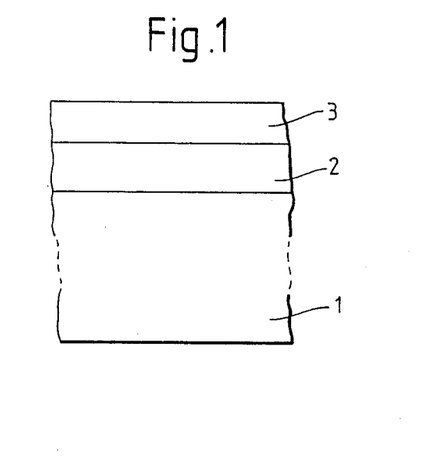
FIG. 1 shows schematically a cross section of an optical power limiter structure according to a first embodiment of the present invention.

Referring to FIG. 1, an optical power limiter structure comprises a semiconductor substrate 1, having a cladding region layer 2 and a core region layer 3 thereon. The upper surface of the core region layer 3 is exposed to air. (Terms such as "upper" which imply a specific orientation are used herein for convenience of description only and should not be taken to indicate a constraint).

The core and cladding region layers 3, 2 are both multiple quantum well (MQW) layers. This is not an essential feature of the core and cladding region layers 3, 2 as it has been found that, at operating wavelengths close to the effective band edges, MQW material and bulk samples show roughly the same nonlinear refractive index behaviour. In fact, it is an important feature of the present invention that the nonlinear refractive index is a strong function of operating wavelength close to the band edge, and it is possible to get large nonlinearities in any given semiconductor provided low-loss transmission can be obtained sufficiently close to the band-gap. There is however a trade-off between attenuation and nonlinear refractive index, and the present structure will be subject to the effects of this trade-off just like any other. The advantage of using MQW layers is the control then available over refractive index (in the absence of an input signal).

The MQW layers comprise the ternary material Ga In As separated by barrier layers of Al In As, the compositions of these alloys being chosen to lattice match InP which is the material of the substrate 1. The refractive indexes $n_o$ of the core region layer 3 in the absence of an input signal, and $n_s$ of the cladding layer 2, are determined by the thicknesses of the Ga In As layers (wells) and Al in As layers (barrier layers) of the MQW layers. The barrier layers in each case are 30 Angstroms deep. In the core region layer 3, 120 Angstrom wells give a refractive index $n_o$ of 3.43 at a bandgap of about 0.8 eV (equivalent wavelength 1.55 μm). In the cladding region layer 2, 60 Angstrom wells give a refractive index $n_s$ of about 3.38 at a bandgap of 0.87 eV (equivalent wavelength 1.43 μm). The core region layer 3 is 1 μm thick, this giving single transverse mode operation at operating wavelengths equivalent to photon energies just below 0.8 eV. The cladding layer 2 is at least 10 μm thick. The cladding layer thickness can be reduced to a more acceptable thickness if it has a lower refractive index. (The lower cladding should be thick compared with the extend of the guided mode into it. If it is not and if it is bounded by a layer of lower refractive index, as is the case with Ga In As P and related compounds in InP, the small index step between the core and the cladding behaves as merely a perturbation in a thick guide formed of the core plus the cladding, and there is very little change with increasing optical intensity. If a substrate of suitable refractive index cannot be found, a thick ($\simeq$10 μm) epitaxial cladding layer, probably of semiconductor alloy, must be grown).

In use, a continuous wave (cw) optical input signal is fed to the core region layer 3, having a photon energy of about 30 meV below 0.8 eV. This will affect the effective refractive index of the core region layer 3. The effective refractive index $n_c$ of the core region layer 3 can be represented as $(n_o - n_2 I)$ where $n_2$ is the change in refractive index of the core region layer 3 per unit of intensity (in W cm$^{-2}$)I of the input signal. At wavelengths close to the bandgap of the core region layer 3, $n_2$ is of the order of $10^{-5}$ per unit of intensity. Taking no account of the asymmetry of the structure regarding $n_s$ and $n_a$, the structure described will start to show a power limiting characteristic when the input signal has an optical intensity of the order of $5 \times 10^3$ W/cm$^2$. That is, the equation $$n_o - n_2 I = n_s \quad \text{(E3)}$$

is true at that order of intensity. Hence the waveguiding action of the structure would then be lost and the input signal will spread into the cladding region layer 2.

Taking account of the asymmetry of the structure however, the power limiting characteristic will take effect at a lower input signal intensity. In this particular case, the actual relationship $$(n_o - n_2 I)^2 - n_s^2 \leq \left(\frac{\lambda}{5d}\right)^2 \quad \text{(E4)}$$

applies. This gives a power limiting characteristic at input signal intensities of about $3.5 \times 10^3$ or less.

Equation (E4) given above is specific to the structure described above with reference to FIG. 1. The value of the factor 5 in the expression $\lambda/5d$ is determined by the degree of asymmetry in the structure, that is, by the relationship between $n_o$, $n_a$, and $n_s$. In practice, it will be found that if the asymmetry is increased, the factor 5 will be replaced by a value approaching or equal to 4. If the asymmetry is decreased, the factor 5 will be replaced by a greater value up to the worst case limit in which the expression $\lambda/5d$ is replaced by zero. In that case, equation (E3) applies, the waveguide being symmetric in terms of refractive indexes $n_a$ and $n_s$.

For an optical spot size of the order 1 μm$^2$ the corresponding critical power level is about 0.035 mW, a level which is of appropriate magnitude for avoidance of saturation effects in optical receivers in communications.

Although in the arrangement discussed above a cw signal is used, it is not necessary. However, it is important that fluctuations in temperature should not override the changes in refractive index which an optical limiter structure according to an embodiment of the present invention relies on. Hence either a high repetition rate input signal should be used, or good heat sinking. Temperature fluctuations over periods of the order of milliseconds, and possibly microseconds, may well be found to dominate undesirably over the electronic effects relied on.

Figure 2:
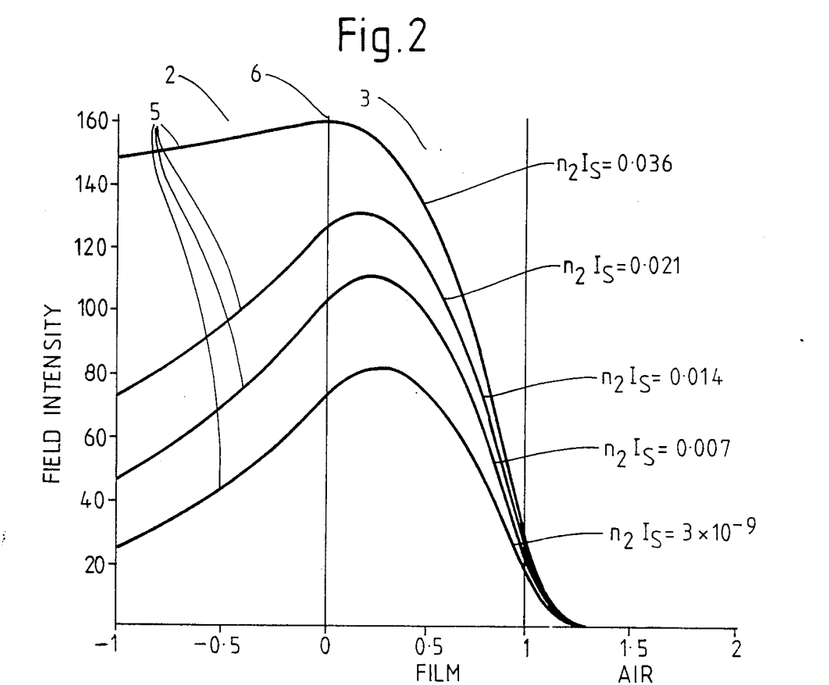
FIG. 2 shows in graph form the optical input signal distribution in the structure of FIG. 1 (turned through 90°) plotted for different values of input signal intensity.

A theoretical nonlinear waveguide analysis of the operation of the structure described above with reference to FIG. 1 can be used to plot transverse optical intensity distributions in the structure for various values of the parameter $n_2 I_s$, where $I_s$ is the optical intensity value at the core/cladding interface. Referring to FIG. 2, it can be seen that as this parameter $n_2 I_s$ increases, the proportion of the optical input signal travelling in the cladding 5 increases, and for the value $n_2 I_s = 0.036$, there is dramatic spreading of the optical intensity into the cladding. Hence, at an optical intensity at the core/cladding interface 6 of $3.6 \times 10^3$ W/cm$^2$ there appears a strong power limiting characterstic. (It should be noted that the theoretical analysis used here neglects attenuation of the input signal in the structure. It is preferably anyway that the core region at least of the structure should show low attenuation so that the signal output of the structure is reasonably high for a structure length which is physically convenient to handle. Also, significant attenuation would produce non-uniformity of the defocussing non-linearity along the length of the structure, which may be inconvenient.)

In another embodiment of the present invention, confinement of the signal in the waveguide in the lateral direction may be provided as well as in the transverse direction. For instance, referring to FIG. 3, a rib 4 may be made in the top (core region) layer 3 to confine the light laterally. The width and height of the rib 4 must be chosen to ensure single-mode propagation both laterally and transversely. Once again the refractive indexes will be chosen to permit loss of waveguide action at a critical value of optical intensity. It is possible that breakdown of waveguiding in this structure might be arranged to occur in the lateral direction before it occurs in the transverse direction.

Figure 7:
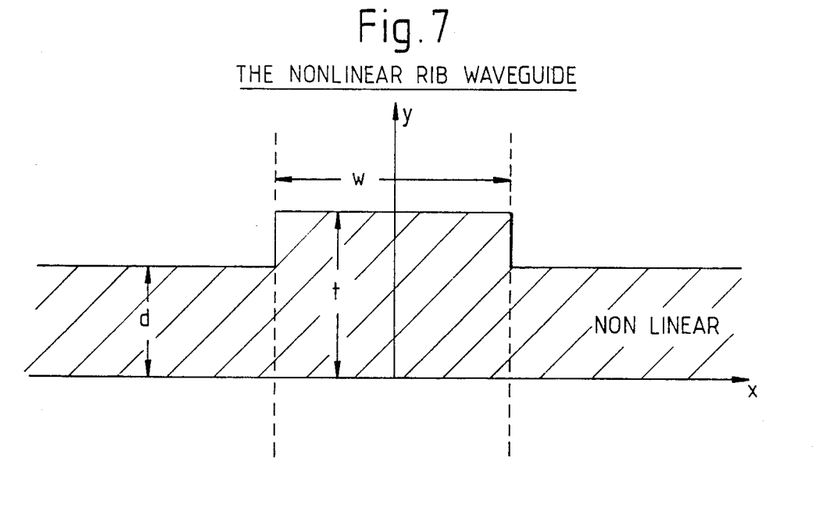
FIG. 7 shows schematically a cross section through a nonlinear rib waveguide.

An analysis has been carried out of a rib waveguide whose cross-section is shown in FIG. 7. The specific structure modelled corresponds to using InGaAs/InAlAs MQW material of two different well/barrier thicknesses for the nonlinear core layer and the lower cladding. However, the quantum-confinement properties of MQW material are not used in the device operation, and the analysis is sufficiently general to be applied to rib guides made from other materials, provided that the refractive index in the core layer decreases with increasing optical intensity, and the indices in the cladding layers are independent of optical intensity. The upper cladding is assumed to be air, and the operating wavelength is taken as 1.55 μm.

Figure 8:
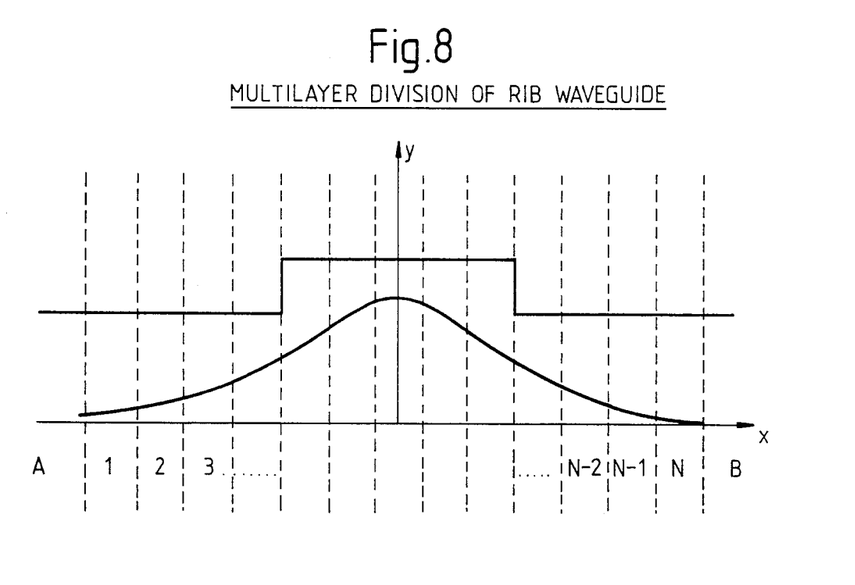
FIG. 8 shows a multilayer division of the rib waveguide of FIG. 7.

The method of analysis involves a multilayer division of the structure in the direction along the epilayers, as illustrated in FIG. 8. At present the results obtained are somewhat sensitive to the number of divisions taken, and the optimum number for accuracy in the limit when the optical field spreads a significant distance has not yet been finally determined.

In its proposed application as an optical power limiter, the device operates by loss of optical confinement along the plane of the epilayers (the x-direction). Light launched into one end of the rib structure, is then not guided to the other end in the usual fashion, but may propagate freely in the slab. A modified version of the device could use absorbing material in the slab to eliminate this optical power or, alternatively, a second rib could be used to collect the power and channel it elsewhere (in the latter case, the device begins to resemble a nonlinear directional coupler).

Figure 9:
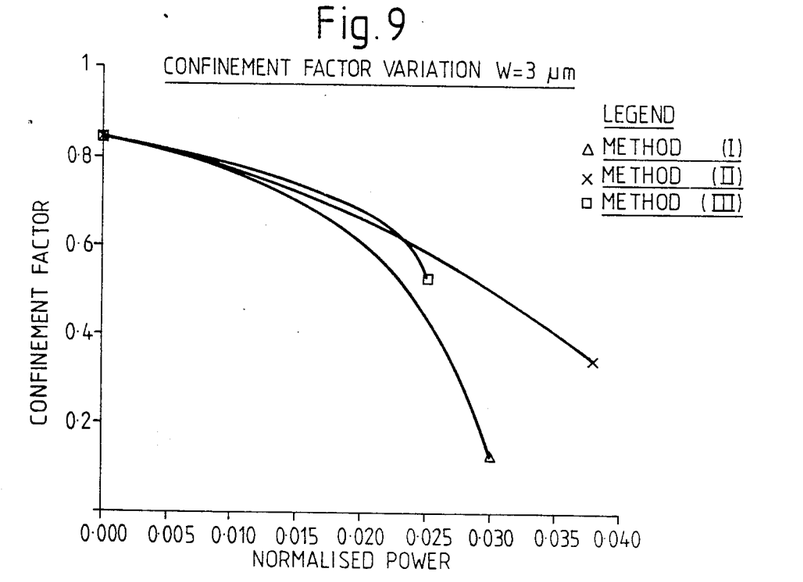
FIGS. 9 and 10 are graphs showing results of calculations of confinement factor versus input power for a rib waveguide device according to the invention.
Figure 10:
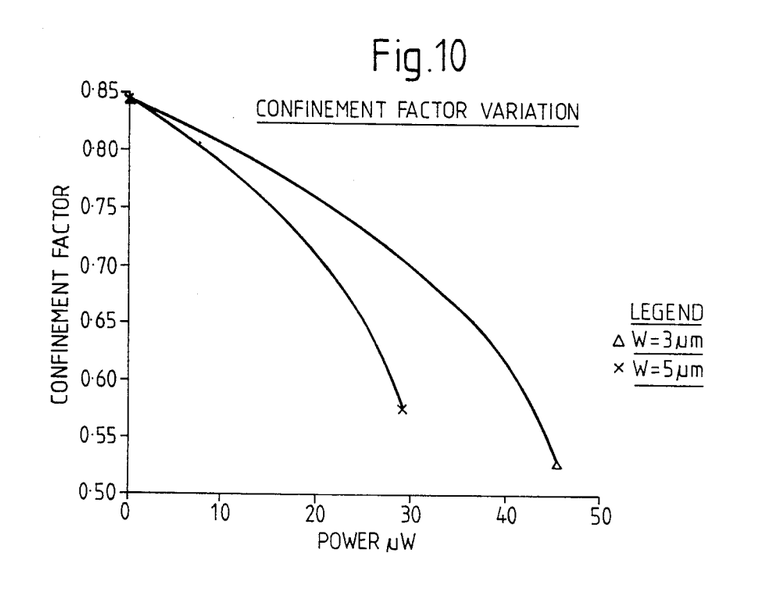

The calculations have concentrated on the behaviour of the optical confinement in the x-direction. FIG. 9 shows results calculated for a rib of width $w=3$ μm, total height $t=1.3$ μm, and a slab of thickness $d=1$ μm, these values being chosen to correspond to a single-mode guide at the cut-off of the first higher-order mode for low optical intensities. The curves labelled I, II and III correspond, respectively, to taking 1, 3 and 45 divisions of the structure as shown in FIG. 8. In FIG. 9 the confinement factor is plotted versus a normalized power which includes the strength of the optical nonlinearity as a parameter. In order to express the results in terms of real power, it is necessary to assume a value for the optical nonlinearity coefficient. This is done in FIG. 10, where it has been assumed that the refractive index decreases by $10^{-5}$ for every W/cm$^2$ of optical intensity. In FIG. 10, the two curves correspond to widths w of 3 μm (for which the height t is 1.3 μm) and 5 μm (for which the value of t is 1.1 μm to ensure single-mode operation); in each case the slab thickness d is 1 μm. The calculations are discontinued before the sensitivity to the number of divisions used becomes too critical. From the results it is clear that a substantial loss of optical confinement is achieved for launch powers of order a few 10's of μW.

Figure 3:
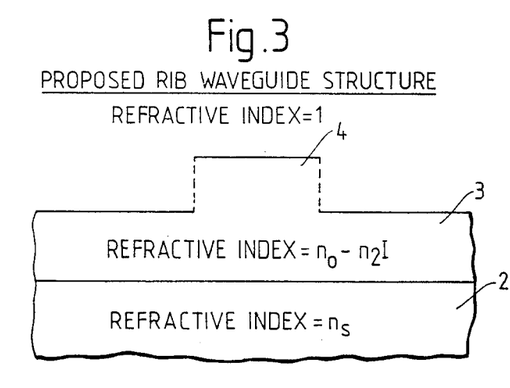
FIGS. 3 and 4 show schematically cross sections of optical power limiter structures according to second and further embodiments of the present invention.
Figure 4A:
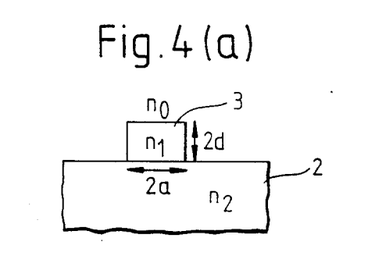
Figure 4B:
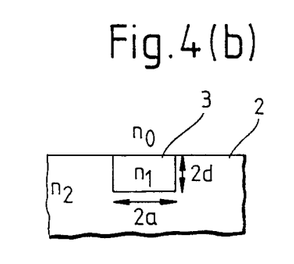
Figure 4C:
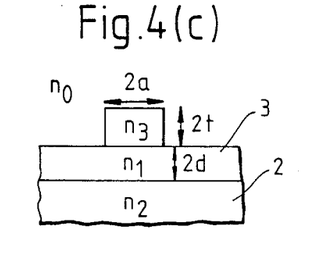

It is important to note that the ribe structure as shown in FIG. 3 is only one possible embodiment of a two-dimensional structure. Referring to FIG. 4, other possible versions are the raised strip (ridge) guide (a), the embedded strip (buried) guide, (b), and the strip-loaded guide (c). All of these can be made to include a defocussing nonlinearity in the core region, and may be expected to show limiting action in a similar manner to that described for the rib guide of FIG. 3.

In achieving an effective optical power limiter using the structure described above with reference to FIGS. 1, 3 and 4, it may not be sufficient merely to allow the optical intensity to spread into the substrate, since a considerable proportion of it may still reach a detector positioned to pick up an output optical signal from the core region. It may then be necessary to include some means of removing the power from the cladding region layer 2, or at least of preventing it from reaching the detector. One such means is to incorporate impurities in the material of the cladding region layer 2 to absorb the light which enters, and thus ensure that it cannot reach the detector.

Figure 5A:
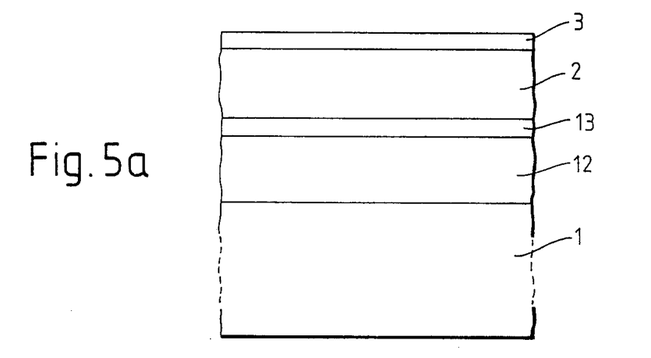
FIG. 5a shows a cross section of part of such an arrangement.
Figure 5B:
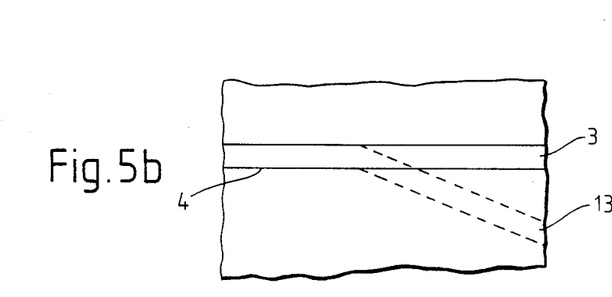
FIG. 5b shows a plan view of such an arrangement.

Referring to FIG. 5a, in a structure showing lateral confinement as shown in FIG. 3, another, alternative means is to include a parallel guiding layer 13, of refractive index close to, or greater than, $n_o$ in order that the light spreading into the cladding region 2 is then captured into this second guiding layer 13. Referring to FIG. 5b, this second guiding layer 13 and the core region layer 3 could then be arranged to separate in a lateral direction in such a way that the light in the second guiding layer 13 is directed away from the detector (not shown). This second guiding layer 13 has a second, associated cladding layer 12.

Extra layers, in addition to those described above with reference to the Figures, may be incorporated in a limiter structure according to an embodiment of the present invention. For instance, extra layers may be used to give a structure particular waveguiding characteristics. Alternatively, if a structure is integrated with other components, it may be convenient that the structure incorporates an uppermost oxide layer. However, such extra layers will merely form part of the core of cladding regions, in practice.

A further embodiment of the invention makes use of the possibility with MQW materials of varying independently the band gap (and hence operating wavelength) and refractive index of a MQW material. The lowest energy absorption edge in a MQW material is that of the wells. The position of the absorption edge may be shifted to higher engery by making the wells thinner. In the present application, the refractive index of the material is an average of those of the wells and the barriers, since the layer thicknesses of the wells and barriers are much smaller than the region to which the optical fields are confined.

Figure 11:
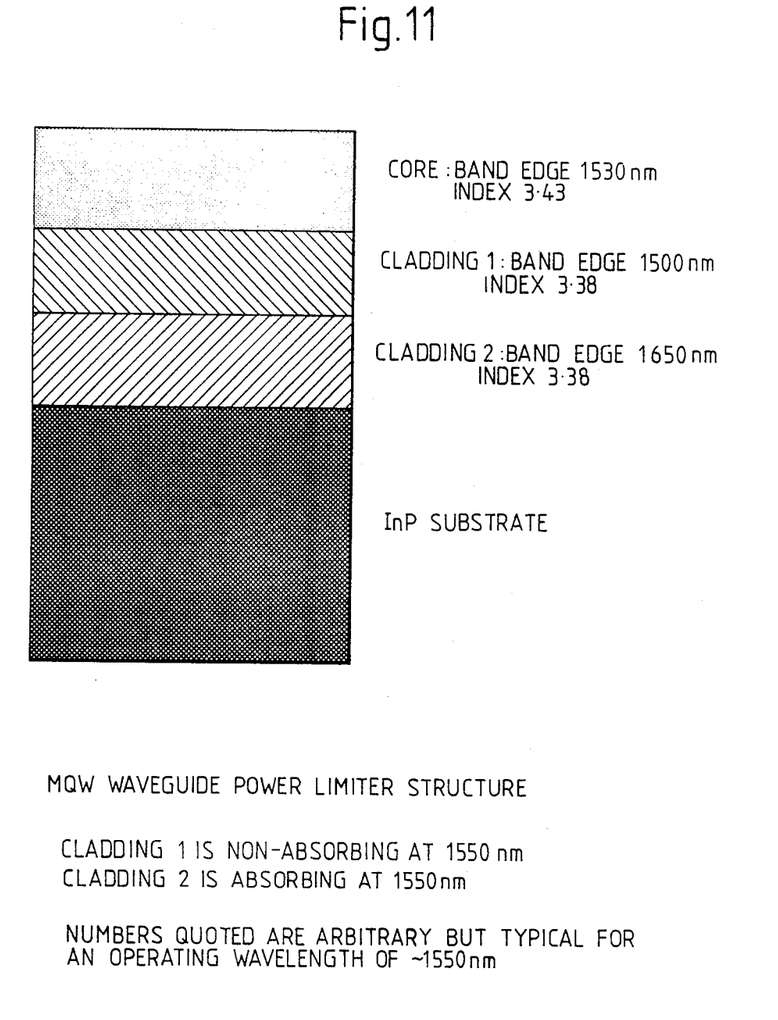
FIG. 11 is a schematic cross section through a multiple quantum well waveguide device according to the invention.

An example of a power limiter structure using MQW material is shown schematically in cross section in FIG. 11, and consists of a non-linear core material with a band edge close to and less than the operating wavelength (in this example 1.55 μm), say 1.53 μm, and with a first refractive index to say 3.43, and a two part lower cladding. Closest to the core, a linear cladding layer with a refractive index slightly lower than the first, say 3.38, and a wider band gap, say 1.5 μm, and then a second cladding layer of the same refractive index as the first cladding but with its band edge, say 1.65 μm, chosen to make it absorbing at the chosen operating wavelength. The whole could be grown on an InP substrate (or any other suitable material) without the cladding having to be prohibitively thick, as the absorbing layer (the second cladding layer) will ensure that the guided mode fields do not extend to the substrate interface. The first, transparent, cladding layer is necessary to prevent excessive absorption of the guided mode at low intensity. This structure has the added benefit that at high intensity, the radiation spread into the cladding regions will be absorbed and therefore will not be observed at the output of the device.

Figure 6:
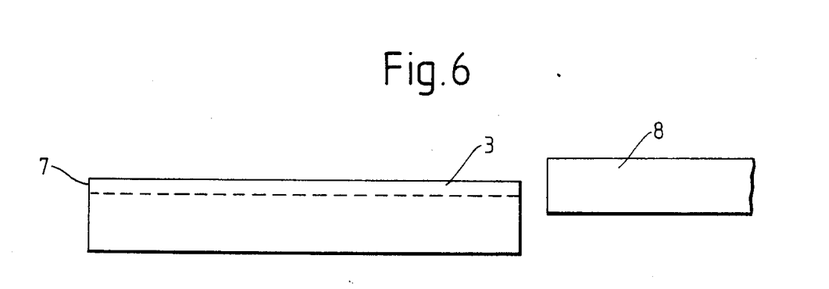
FIG. 6 shows schematically an optical power limiter incorporating an optical power limiter structure according to an embodiment of the present invention.

Referring to FIG. 6, an optical power limiter based on a structure as described above with reference to FIGS. 1 to 5 or 7 to 11 inclusive will show additional features such as an input port 7 for an optical signal to be input to the core region 3, and means such as an optical fibre 8 for picking up the output signal from the core region 3. The embodiment shown in FIG. 6 is not an integrated arrangement. In such an arrangement, the optical fibre 8 might be replaced by a further waveguide on a common wafer with the waveguide of the limiter structure. Also, the input port 7 might be defined in another way than by an exposed facet on the end of the limiter structure, for instance by an interface between the limiter structure and another structure. The optical fibre 8 might also be replaced directly by a photodetector.

We claim:

1. An optical power limiter structure for use in limiting the power of an optical signal having a wavelength $\lambda$, comprising a direct-gap semiconductor material waveguide, having a core region of refractive index $n_c$ bounded on a first side by a first cladding region of material of refractive index $n_s$ and bounded on a second, opposing side by a second cladding region of material of refractive index $n_a$, wherein $\lambda$ is slightly greater than the bandgap equivalent wavelength of the core region material, $\lambda_c$, but substantially greater than the bandgap equivalent wavelength of the second cladding region, $\lambda_s$, and wherein $n_c$ varies inversely with the intensity of the optical signal at the wavelength $\lambda$, but $n_s$ and $n_a$ remain at least substantially constant, such that at a preselected threshold intensity of the optical signal, $n_c$ approaches $n_s$ sufficiently to allow significant spread of the optical signal into the first cladding region.

2. A structure according to claim 1 wherein $\lambda$ lies above $\lambda_c$ by an amount in the range of 10 to 40 nm inclusive.

3. A structure according to claim 1 wherein $n_s$ is greater than $n_a$ by an amount of the order of 1 or more.

4. A structure according to claim 3 wherein the cladding material bounding the second side of the core region is air.

5. A structure according to claim 1 wherein the waveguide shows single transverse mode propagation at wavelength $\lambda$.

6. A structure as claimed in claim 1 wherein the first cladding region is bounded on the side remote from the core region by a third cladding region of material having a refractive index $n_t$ and a bandgap equivalent wavelength $\lambda_t$, wherein $n_t$ is less than $n_c$ and substantially the same as $n_s$, and wherein $\lambda_t$ is greater than $\lambda_c$.

7. A structure as claimed in claim 6 wherein the core region and the materials of the first and third cladding regions each comprise a multiple-quantum-well material.

8. An optical power limiter comprising a structure according to claim 1 an input port for an optical signal to the core region, and means for picking up the output signal from the core region of the waveguide.

9. A limiter according to claim 8 which further comprises preventative means for preventing optical radiation propagating in a cladding region of the waveguide from coupling into the means for picking up the output signal emitted from the core region.

10. A limiter according to claim 10 wherein the preventative means comprises absorbing material in the cladding region.

11. A limiter according to claim 10 wherein the preventative means comprises a second waveguide arranged to divert optical radiation propagating in the cladding region away from the means for picking up the signal emitted from the core region.

12. An optical power limiter structure for use in limiting the power of an optical signal having a wavelength $\lambda$, comprising a direct-gap semiconductor material waveguide, having a core region of refractive index $n_c$ bounded on a first side by a first cladding region of material of refractive index $n_s$ and bounded on a second, opposing side by a second cladding region of material of refractive index $n_a$, wherein $\lambda$ is within 20 nm of the bandgap equivalent wavelength of the core region material, $\lambda_c$, but substantially greater than the bandgap equivalent wavelength of the second cladding region, $\lambda_s$, and wherein $n_c$ varies inversely with the intensity of the optical signal at the wavelength $\lambda$, but $n_s$ and $n_a$ remain at least substantially constant, such that at a preselected threshold intensity of the optical signal, $n_c$ approaches $n_s$ sufficiently to allow significant spread of the optical signal into the first cladding region.

* * * * *